United States Patent
Zhang

(10) Patent No.: US 11,790,647 B2
(45) Date of Patent: Oct. 17, 2023

(54) OBJECT RECOGNITION IN PHOTOGRAPHS AND AUTOMATIC SHARING

(71) Applicant: HUAWEI TECHNOLOGIES CO., LTD., Shenzhen (CN)

(72) Inventor: Xuenan Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 374 days.

(21) Appl. No.: 16/495,873

(22) PCT Filed: Jul. 14, 2017

(86) PCT No.: PCT/CN2017/092944
§ 371 (c)(1),
(2) Date: Sep. 20, 2019

(87) PCT Pub. No.: WO2018/171090
PCT Pub. Date: Sep. 27, 2018

(65) Prior Publication Data
US 2020/0104597 A1    Apr. 2, 2020

(30) Foreign Application Priority Data
Mar. 22, 2017  (CN) .......................... 201710175226.9

(51) Int. Cl.
*G06K 9/00* (2022.01)
*G06V 20/20* (2022.01)
(Continued)

(52) U.S. Cl.
CPC .............. *G06V 20/20* (2022.01); *G06F 16/55* (2019.01); *G06F 16/583* (2019.01);
(Continued)

(58) Field of Classification Search
CPC .......... G06K 9/00442; G06K 9/00463; G06K 9/00671; G06K 9/00456; G06K 9/00449;
(Continued)

(56) References Cited

U.S. PATENT DOCUMENTS 8,655,028 B2   2/2014   Hsi
2010/0311347 A1*  12/2010  Le Thierry D'Ennequin .............
H04W 8/005
455/67.11

(Continued)

FOREIGN PATENT DOCUMENTS

| CN | 101183206 A | 5/2008 |
| CN | 103235814 A | 8/2013 |

(Continued)

OTHER PUBLICATIONS

XP055664579 Tomoya Onishi et al.,"Personal photo browser that can classify photos by participants and situations", May 21-25, 2012, total 2 pages.

*Primary Examiner* — Alex Kok S Liew
(74) *Attorney, Agent, or Firm* — Rimon PC

(57) ABSTRACT

Embodiments of the present invention provide a method for recognizing an object in a photo and determining a terminal associated with the object in the photo. The method includes: determining an object in a photo by using a biological feature recognition technology; and determining a terminal that belongs to the object in the photo based on (Continued)

object-terminal relationship information, so that a an apparatus such as a smart device automatically obtains information about the terminal that belongs to the object in the photo, and shares the photo with the terminal.

10 Claims, 2 Drawing Sheets

(51) Int. Cl.
    *G06F 16/55*     (2019.01)
    *G06F 16/583*     (2019.01)
    *G06F 16/58*     (2019.01)
    *G06V 40/16*     (2022.01)
    *H04L 51/214*     (2022.01)

(52) U.S. Cl.
    CPC ........ *G06F 16/5866* (2019.01); *G06V 40/172* (2022.01); *H04L 51/214* (2022.05)

(58) Field of Classification Search
    CPC ............... G06K 9/18; G06K 9/4671; G06K 2009/4666; G06K 2209/01; G06K 9/344; G06K 9/4604; G06K 9/4652; G06K 9/723; G06K 9/00483; G06K 9/228; G06K 9/6202; G06K 9/00281; G06K 9/00805; G06K 9/72; G06K 2009/00932; G06K 2209/27; G06K 9/00046; G06K 9/00255; G06K 9/00288; G06T 2207/10004; G06T 2207/10024; G06T 2207/30176; G06T 7/11; G06T 7/187
    See application file for complete search history.

(56) References Cited

U.S. PATENT DOCUMENTS

| | | |
|---|---|---|
| 2012/0134545 A1 | 5/2012 | Lai |
| 2012/0209563 A1* | 8/2012 | Takeda .................... A63F 13/42 |
| | | 702/158 |
| 2013/0055348 A1* | 2/2013 | Strauss .................. G06F 21/40 |
| | | 726/3 |
| 2013/0136316 A1 | 5/2013 | Grassel et al. |
| 2015/0138330 A1* | 5/2015 | Krishnamoorthi ........................... |
| | | G06K 9/00369 |
| | | 348/77 |
| 2015/0142891 A1 | 5/2015 | Haque et al. |
| 2015/0154447 A1* | 6/2015 | Wilson ................. A63F 13/211 |
| | | 382/103 |

FOREIGN PATENT DOCUMENTS

| | | |
|---|---|---|
| CN | 104317932 A | 1/2015 |
| CN | 105025162 A | 11/2015 |
| CN | 105119971 A | 12/2015 |
| CN | 105740426 A | 7/2016 |
| CN | 105897564 A | 8/2016 |
| CN | 106034179 A | 10/2016 |
| CN | 106326820 A | 1/2017 |
| CN | 106534481 A | 3/2017 |
| TW | 201223209 A | 6/2012 |
| WO | 2016146060 A1 | 9/2016 |

\* cited by examiner

OBJECT RECOGNITION IN PHOTOGRAPHS AND AUTOMATIC SHARING

This application is a national stage of International application No. PCT/CN2017/092944, filed on Jul. 14, 2017, which claims priority to Chinese Patent No. 201710175226.9, filed on Mar. 22, 2017. Both of the aforementioned applications are hereby incorporated by reference in their entireties.

TECHNICAL FIELD

Embodiments of this application relates to the field of electronic technologies, and in particular, to a method for determining a terminal of an object in a photo and a terminal for implementing the method.

BACKGROUND

A user usually uses a terminal (which may be referred to as an intelligent terminal and may include a device such as a mobile phone or a tablet computer) to take photos, and then manually selects a photo that includes a captured object to a terminal of the corresponding object. Especially, when a group photo is taken for a plurality of people during an outing, objects in the group photo need to be manually recognized, and then the photo is manually sent to terminals of the objects in the group photo. Such an operation is relatively cumbersome, and user experience is poor.

SUMMARY

Embodiments of the present invention provide a method for determining a terminal of an object in a photo and a terminal for implementing the method. An object in a photo is recognized based on a biological feature, and a terminal of the object is determined based on object-terminal relationship information, so that the terminal of the object in the photo is automatically recognized, and further the photo is sent to the terminal of the corresponding object, thereby improving user experience.

According to a first aspect, an embodiment of the present invention provides a method for determining a terminal of an object in a photo. The method includes:

determining an object in a photo through biological feature recognition; and determining a terminal of the object in the photo based on object-terminal relationship information, so that a capture terminal automatically detects the terminal of the object in the photo, and further implements sharing of the photo, thereby improving user experience.

With reference to the first aspect, in a first possible implementation of the first aspect, the method may further include:

determining the object-terminal relationship information.

With reference to the first possible implementation of the first aspect, in a second possible implementation of the first aspect, the determining the object-terminal relationship information includes:

determining the object-terminal relationship information based on at least one photo that includes the same object, signal strength information that is of at least one terminal and that is detected when each of the at least one photo is captured, and an object distance at which the object in each photo is captured.

With reference to the second possible implementation of the first aspect, in a third possible implementation of the first aspect, the determining the object-terminal relationship information based on at least one photo that includes the same object, signal strength information that is of at least one terminal and that is detected when each of the at least one photo is captured, and an object distance at which the object in each photo is captured includes:

using any one of the at least one photo as a reference photo, and using, as a weighting coefficient, a ratio of an object distance at which the object in the at least one photo other than the reference photo is captured to an object distance at which the object in the reference photo is captured;

performing, by using the weighting coefficient, a weighting operation on the signal strength information that is of the at least one terminal and that is detected when the at least one photo is captured, to obtain a weighted value of the signal strength information of the at least one terminal; and if the weighted value of the signal strength information of the at least one terminal meets a threshold condition, determining the object-terminal relationship information.

With reference to any one of the first aspect or the possible implementations of the first aspect, in a fourth possible implementation of the first aspect, the method may further include: sending the photo to the terminal of the object.

According to the solution provided in this embodiment of the present invention, the capture terminal determines the terminal of the object in the photo based on the object-terminal relationship information, and sends the photo to the terminal of the object, thereby implementing sharing of the photo. Such a sharing process is easy for a user to operate and improves user experience.

According to a second aspect, an embodiment of the present invention provides a terminal device. The terminal may include:

a processing unit, configured to determine an object in a photo through biological feature recognition, where the processing unit is further configured to determine a terminal of the object in the photo based on object-terminal relationship information stored in a storage unit, so that a capture terminal automatically detects the terminal of the object in the photo, and further implements sharing of the photo, thereby improving user experience.

With reference to the second aspect, in a first possible implementation of the second aspect, the processing unit is further configured to determine the object-terminal relationship information.

With reference to the first possible implementation of the second aspect, in a second possible implementation of the second aspect, the processing unit determines the object-terminal relationship information based on at least one photo that includes the same object, signal strength information that is of at least one terminal and that is detected when the at least one photo is captured, and an object distance at which the object in each photo is captured.

With reference to the second possible implementation of the second aspect, in a third possible implementation of the second aspect, the processing unit uses any one of the at least one photo as a reference photo, and uses, as a weighting coefficient, a ratio of an object distance at which the object in the at least one photo other than the reference photo is captured to an object distance at which the object in the reference photo is captured; and the processing unit performs, by using the weighting coefficient, weighting calculation on the signal strength information that is of the at least one terminal and that is detected when the at least one photo is captured, to obtain a weighted value of signal strength of the at least one terminal;

and if the weighted value of the signal strength information of the at least one terminal meets a threshold condition, determines the object-terminal relationship information.

With reference to any one of the second aspect or the possible implementations of the second aspect, in a fourth possible implementation of the second aspect, the terminal further includes a sending unit, configured to send the photo to the terminal of the object.

According to the terminal provided in this embodiment of the present invention, the terminal of the object in the photo is determined based on the object-terminal relationship information, and the photo is sent to the terminal of the object, thereby implementing sharing of the photo. Such a sharing process is easy for a user to operate and improves user experience.

According to a third aspect, an embodiment of the present invention provides a computer program product including an instruction. When the computer program product runs on a computer, the computer is enabled to perform the method in any one of the first aspect or the possible implementations of the first aspect.

According to a fourth aspect, an embodiment of the present invention provides a computer readable storage medium. The computer readable storage medium stores a computer program, and when the computer program is executed by a processor, the method in any one of the first aspect or the possible implementations of the first aspect is implemented.

DESCRIPTION OF EMBODIMENTS

Embodiments of the present invention provide a method for determining a terminal of an object in a photo and a terminal for implementing the method. An object in a photo is recognized by using a biological feature recognition technology, and a terminal of the object is determined based on object-terminal relationship information, so that the terminal of the object in the photo is automatically recognized, and further the photo is sent to the terminal of the corresponding object, thereby improving user experience.

The following describes a technical solution of the present invention with reference to the accompanying drawings.

Figure 1:
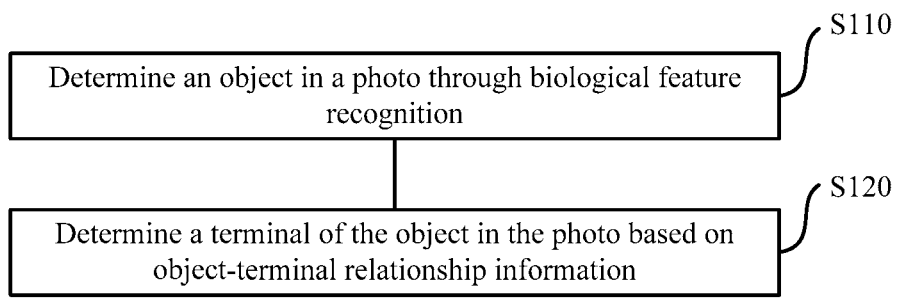
FIG. 1 is a flowchart of a method for determining a terminal of an object in a photo according to an embodiment of the present invention.

FIG. 1 is a flowchart of a method for determining a terminal of an object in a photo according to an embodiment of the present invention. The method is performed by a terminal. As shown in FIG. 1, the method may include the following steps.

S110. Determine an object in a photo through biological feature recognition.

The terminal compares, by using a biological feature recognition technology, a biological feature of a to-be-recognized object in the photo with a biological feature of an object stored in the terminal, to determine the object in the photo.

If the photo is a group photo, each to-be-recognized object in the group photo is recognized by using the biological feature recognition technology.

S120. Determine a terminal of the object in the photo based on object-terminal relationship information.

The object-terminal relationship information is information about a relationship between an object and a terminal of the object. The terminal compares the determined object in the photo with an object corresponding to the object-terminal relationship information stored in the terminal. If the object in the photo matches the object corresponding to the relationship information, the terminal of the object in the photo is determined. For example, if the photo is a group photo, and it is learned through biological feature recognition that the group photo includes an object B and an object C. The object-terminal relationship information stored in the terminal includes information about a relationship between the object B and a terminal X2 of the object B, information about a relationship between the object C and a terminal X3 of the object C, and the like. In this case, it is finally determined that a terminal of the object B is X2, and a terminal of the object C is X3.

In this embodiment of the present invention, information about a relationship between an object and a terminal of the object may be specifically a correspondence between the object and identifier information of the terminal of the object. The identifier information is an identifier that can uniquely identify the terminal. For example, the identifier is a Bluetooth MAC address of the terminal, a protocol transmission-based IMEI, or an SN.

According to the method for determining a terminal of an object in a photo provided in this embodiment of the present invention, the object in the group photo is recognized by using the biological feature recognition technology, and then the terminal of the terminal is determined based on the object-terminal relationship information, so that the capture terminal automatically detects the terminal of the object in the photo, and further implements sharing of the photo, thereby improving user experience.

Figure 2:
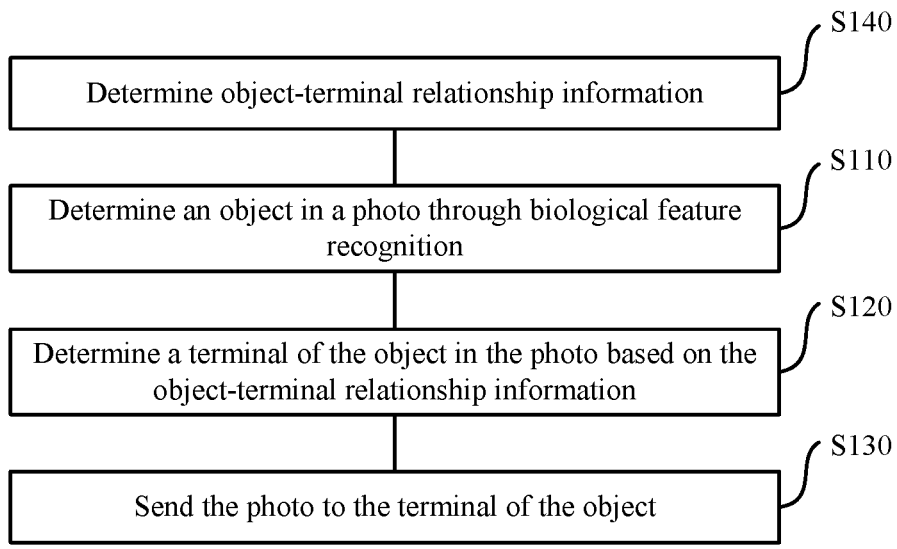
FIG. 2 is a flowchart of sharing a photo according to an embodiment of the present invention.

Optionally, as shown in FIG. 2, in this embodiment of the present invention, the method may further include the following step:

S130. Send the photo to the terminal of the object.

The capture terminal determines the terminal of the object in the photo based on the object-terminal relationship information, and sends the photo to the terminal of the object, thereby implementing sharing of the photo. Such a sharing process is easy for a user to operate and improves user experience.

In this embodiment of the present invention, for example, during an outing, a plurality of friends mutually take group photos by using a terminal, and after one or more photos are captured, the terminal displays prompt information indicating to send the photo(s) to a friend. A user may send the photo(s) to a terminal of an object in the photo(s) according to the prompt information. Alternatively, before a photo is captured, a terminal is first authenticated, and an automatic transmission function is enabled. After one or more photos are captured, all the captured photos are transmitted to terminals of corresponding objects. Alternatively, after the outing, the user sends the captured photos to the terminals of the corresponding objects by using a one-key sharing function. In this embodiment of the present invention, details about how to share a photo and when to share a photo are not limited.

As shown in FIG. 2, in this embodiment of the present invention, before the terminal of the object in the photo is determined based on the object-terminal relationship information, or when the object in the photo or the terminal of the object is not recognized, the method may further include the following step:

S140. Determine the object-terminal relationship information.

For example, an object A travels together with friends: an object B, an object C, an object D, and an object E. In this embodiment of the present invention, an example in which a terminal of the object A is used to capture photos is used to describe the technical solution of this embodiment of the present invention.

When capturing a photo of any combination of the object B, the object C, the object D, and the object E, the terminal of the object A needs to detect a nearby terminal, signal strength information of the terminal, and an object distance between captured objects and the terminal of the object A. In a photo capture process, distances between the object A and other objects (which may be understood as distances between the terminal of the object A and terminals of the other objects) are different, and signal strength, received by the terminal of the object A, of signals of the terminals of the other objects are also different. Therefore, there are some difficulties for the terminal of the object A to recognize the object B, the object C, the object D, and the object E in a captured photo and the terminals corresponding to the objects, as listed in Table 1.

TABLE 1

| Terminal type | Same distance between terminals | Different distances between terminals |
| --- | --- | --- |
| Same | Unable to recognize | Easy to recognize |
| Different | Easy to recognize | Able to recognize |

In this embodiment of the present invention, the signal strength information of the terminal may be signal strength information of a Bluetooth signal, signal strength information of an NB-IoT signal, signal strength information of a ZigBee signal, or the like. This is not limited in this embodiment of the present invention.

Optionally, in an embodiment of the present invention, the object-terminal relationship information may be determined in the following manner:

determining the object-terminal relationship information based on at least one photo that includes the same object, signal strength information that is of at least one terminal and that is detected when each of the at least one photo is captured, and an object distance at which the object in each photo is captured.

A specific process may be as follows: Any group photo of the at least one photo is used as a reference photo, and a ratio of an object distance at which the object in the at least one group photo other than the reference photo is captured to an object distance at which the object in the reference photo is captured is used as a weighting coefficient; a weighting operation is performed, by using the weighting coefficient, on the signal strength information that is of the at least one terminal and that is detected when the at least one photo is captured, to obtain a weighted value of the signal strength information of the at least one terminal; and if the weighted value of the signal strength information of the at least one terminal meets a threshold condition, the object-terminal relationship information is determined.

For example, it is assumed that X1 is the object B, X2 is the object C, X3 is the object D, X4 is the object E, X5 is an object F, and Xn is another passerby or a non-friend object. Y identifies identifier information of a terminal carried by an object and detected signal strength information corresponding to the terminal. Y1 represents a terminal carried by the object B and signal strength information corresponding to the terminal; Y2 represents a terminal carried by the object C and signal strength information corresponding to the terminal; Y3 represents a terminal carried by the object E and signal strength information corresponding to the terminal; and Y4 represents a terminal carried by the object F and signal strength information corresponding to the terminal. Herein, it is assumed that Bluetooth of a terminal carried by the object D is disabled.

It is assumed that when the object A takes a group photo with a number 1 (a first photo) in Table 2, the object E is next to the object A but the object E is not in the captured group photo. In this case, the signal strength information Y3 of the terminal carried by the object E is detected when the object A takes the group photo with the number 1 by using the terminal carried by the object A. When the object A takes a group photo with a number 2 (a second photo) in Table 2, assuming that the object F who carries the terminal X5 of the object F is next to the object A, the signal strength information Y4 of the terminal carried by the object F is detected when the object A takes the group photo with the number 2 by using the terminal of the object A. When the object A takes a group photo with a number 3 in Table 2, assuming that the object E stands next to the object A, the signal strength information Y3 of the terminal carried by the object E is detected when the object A takes the group photo with the number 3 (a third photo) by using the terminal of the object A.

In this embodiment of the present invention, a plurality of photos that include a same object are used, and the photos may be group photos. As listed in Table 2, three photos that include the same object B are used. The three photos are group photos of combinations of the object B and the object C, the object D, and the object E. A group photo of the object B, the object C, and the object D is used as a reference photo. To be specific, when the objects in the reference photo are captured, a ratio of a distance between a terminal of a captured object (the object B, the object C, and the object D) in each of the other two photos and the terminal of a capturer (the object A) to a distance between the terminal of the object in the reference photo and the terminal of the capturer is calculated, so as to obtain a weighting coefficient.

For example, if a distance between the terminal of the object B in the second photo (a group photo of the object B, the object D, and the object E) and the terminal of the capturer A is 2, a distance between the terminal of the object D in the second photo and the terminal of the capturer A is 2.5, a distance between the terminal of the object B in the reference photo (the group photo of the object B, the photo C, and the object D) and the terminal of the capturer A is 3, and a distance between the terminal of the object D in the reference photo and the terminal of the capturer A is 3, a weighting coefficient obtained based on the distance of the terminal of the object B is ⅔, and a weighting coefficient obtained based on the distance of the terminal of the object D is ⅔.

TABLE 2

| Number | Group photo combination | Signal strength information | Distance between terminals | Weighted value (A) | | |
|---|---|---|---|---|---|---|
| 1 | B + C + D (reference) | Y1: 4; Y2: 3; Y3: 4 | X1: 3; X2: 3; X3: 3 | X1 | X2 | X3 |
| | | | | Y1 12 | 12 | 12 |
| | | | | Y2 9 | 9 | 9 |
| | | | | Y3 12 | 12 | 12 |
| 2 | B + D + E | Y1: 6; Y3: 5; Y4: 7 | X1: 2; X3: 2.5; X4: ? | X1 | | X3 |
| | | | | Y1 12 | | 15 |
| | | | | Y2 10 | | 12.5 |
| | | | | Y3 14 | | 17.5 |
| 3 | B + D | Y1: 2; Y3: 1 | X1: 6; X3: 6 | X1 | | X3 |
| | | | | Y1 12 | | 12 |
| | | | | Y3 6 | | 6 |

Then, a weighting operation is performed, by using the weighting coefficient, on signal strength information that is of a terminal and that is detected when each photo is captured, to obtain a weighted value. In this embodiment of the present invention, weighting may be performed based on different measurement manners of signal strength. For example, the signal strength may be a value in an exponential form measured in dBm, an absolute value measured in mW, an RSSI ratio, or the like. If a weighted value of detected signal strength information of one terminal is within a specific threshold range, the object-terminal relationship information is determined. In other words, the terminal belongs to the object.

It should be noted that in this embodiment of the present invention, the weighted value is signal strength information obtained when a distance between a signal receiving terminal and a signal transmitting terminal is 1 meter.

For example, an RSSI is used as an example. The weighted value is calculated according to a calculation formula (1): $d=10^{(|RSSI|-A)/(10*n)}$, where d is a distance between terminals that is obtained through calculation based on a photo; the RSSI is received signal strength information of a terminal, and the value is usually a negative value; A is signal strength information obtained when a distance between a signal transmitting terminal and a signal receiving terminal is 1 meter; and n is an environment attenuation factor. In this embodiment of the present invention, all photos are captured in a same environment, and therefore, it is tentatively considered that n is a fixed value. A value of the RSSI is a value of signal strength that is of another terminal and that is detected when a capture terminal captures a photo. The variable A can be obtained through deduction according to the formula. It should be noted that A is a fixed value with regard to a same terminal and the capture terminal.

It can be learned from the formula (1) that $A=\log_{10} 10^{|RSSI|/10*n}*d$.

As listed in Table 2, during capturing of the first photo, the signal strength information Y1, Y2, and Y3 are detected. Through simple biological feature recognition, X1-object B, X2-object C, and X3-object D can be recognized. A is calculated according to the formula (2), to obtain A listed in Table 2. As listed in Table 2, the three photos each include the identifier information Y1 of the terminal of X1-object B, the obtained A is 12, it is considered that there is a correspondence between X1-object B and Y1 of the terminal, and X1-object B is bound to the identifier information Y1 of the terminal. In other words, object-terminal relationship information is determined, and a biological feature of the object B is stored in a biological feature library. In this way, after the object in the photo is subsequently recognized by using the biological feature recognition technology, the terminal of the object is determined based on the object-terminal relationship information, and further the captured photo is shared to the corresponding terminal. This simplifies an operation of sharing the photo and improves user experience. In this embodiment of the present invention, it is assumed that a determining value is a fixed value, for example, three times at minimum, or the determining value is a dynamic ratio value obtained by reference based on a quantity of times that a biological feature of a same object appears in comparison photos. For example, the determining value is 70%. To be specific, if X1-object B appears 10 times, there are at least seven times of successful matching. Therefore, it can be determined through comparison between the three photos in Table 2 that there is only the correspondence between the identifier information Y1 of the terminal and X1-object B, but there is no match object for the identifier information Y3, that also appears, of the terminal. Therefore, during determining of the object-terminal relationship information, more photos indicate a higher possibility of successful matching, and the determined object-terminal relationship information is more accurate.

In this embodiment of the present invention, a threshold range of the weighted value may be set according to a specific case. This is not limited in this embodiment of the present invention.

It should be noted that the formula (1) and the formula (2) are merely an implementation of implementing the technical solution of the present invention. Herein, the formula (1) and the formula (2) are merely used as examples to describe the technical solution of this embodiment of the present invention, and this embodiment of the present invention is not constituted as a limitation.

It should be further noted that values corresponding to the column of the weighted value listed in Table 2 are merely used to describe the technical solution, and the values are not obtained through precise calculation. In addition, it is assumed that n=1. In addition, the photos listed in Table 2 are also captured in an ideal environment in which there is no impact of other objects or terminals and there is a relatively large difference between signal parameters of terminals.

According to the foregoing embodiment, if the terminal of the object A currently captures a new photo, that is, a group photo of the object B, the object C, and the object E, but the object B wears sunglasses. According to a normal recognition procedure, the object B cannot be recognized by using the biological feature recognition technology. The technical solution of this embodiment of the present invention may be used. Based on signal strength information that is of a terminal and that is detected when the photo is captured and a distance between the terminal and the terminal of the capturer A, weighting calculation is performed by using the first photo in Table 2 as a reference photo, and it is finally determined that the object that cannot be recognized is B. The recognized object B who wears the sunglasses is bound to the corresponding terminal, that is, information about a relationship between the object B who wears the sunglasses and the terminal of the object B is determined, so as to subsequently determine an object in the photo and a terminal of the object, and further complete sharing of the photo. This simplifies an operation of sharing the photo and improves user experience.

The foregoing describes the method for determining a terminal of an object in a photo provided in the embodiments of the present invention. The following describes, with reference to FIG. 3, a terminal provided in the embodiments of the present invention.

Figure 3:
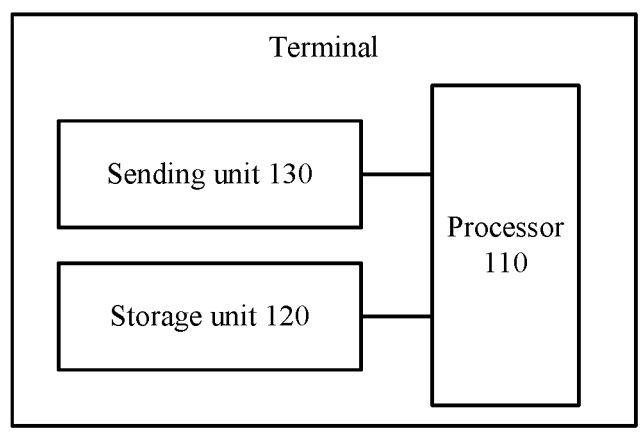
FIG. 3 shows a terminal according to an embodiment of the present invention.

FIG. 3 shows a terminal according to an embodiment of the present invention. As shown in FIG. 3, the terminal may include a processing unit 110 and a storage unit 120.

The processing unit 110 is configured to determine an object in a photo through biological feature recognition.

The processing unit 110 is further configured to determine a terminal of the object in the photo based on object-terminal relationship information stored in the storage unit 120.

The processing unit 110 of the terminal compares, by using a biological feature recognition technology, a biological feature of the object in the photo with a biological feature in the storage unit 120, to determine the object in the photo; and determines the terminal of the object based on the object-terminal relationship information stored in the storage unit 120, so that the capture terminal automatically recognizes the terminal of the object in the photo, and further implements an operation of sharing the photo by the capture terminal, thereby improving user experience.

By comparison, in the prior art, an object in a photo is manually determined, and the photo is manually shared to a terminal of each object. Such a process of sharing the photo is relatively cumbersome. However, in the solution provided in this embodiment of the present invention, an operation is relatively easy, and user experience is improved.

Optionally, in this embodiment of the present invention, the terminal may further include a sending unit 130, configured to send the photo to the terminal of the object. This implements sharing of the photo by the terminal, thereby improving user experience.

Optionally, in this embodiment of the present invention, the processing unit 110 is further configured to determine the object-terminal relationship information.

In an embodiment of the present invention, the processing unit 110 determines the object-terminal relationship information based on at least one photo that includes the same object, signal strength information that is of at least one terminal and that is detected when the at least one photo is captured, and an object distance at which the object in each photo is captured.

For example, the processing unit 110 uses any one of the at least one photo as a reference photo, and uses, as a weighting coefficient, a ratio of an object distance at which the object in the at least one photo other than the reference photo is captured to an object distance at which the object in the reference photo is captured; and performs, by using the weighting coefficient, weighting calculation on the signal strength information that is of the at least one terminal and that is detected when the at least one photo is captured, to obtain a weighted value of signal strength of the at least one terminal. If the weighted value of the signal strength information of the at least one terminal meets a threshold condition, the processing unit 110 determines the object-terminal relationship information. For details about this process, refer to descriptions about the determining the object-terminal relationship information in S130 shown in FIG. 2. For brevity, details are not described herein again.

An embodiment of the present invention provides a computer program product including an instruction. When the computer program product runs on a computer, the computer is enabled to perform the methods/steps shown in FIG. 1 and FIG. 2.

An embodiment of the present invention provides a computer readable storage medium. The computer readable storage medium stores a computer program, and when the computer program is executed by a processor, the methods/steps shown in FIG. 1 and FIG. 2 are implemented.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraints of the technical solution. A person skilled in the art may use different methods to implement the described functions for each particular application, but it should not be considered that the implementation goes beyond the scope of this application.

A person of ordinary skill in the art may understand that all or some of the steps in each of the foregoing method of the embodiments may be implemented by a program instructing a processor. The foregoing program may be stored in a computer readable storage medium. The storage medium may be a non-transitory (non-transitory) medium, such as a random access memory, a read-only memory, a flash memory, a hard disk, a solid state drive, a magnetic tape (magnetic tape), a floppy disk (floppy disk), an optical disc (optical disc), or any combination thereof.

The foregoing descriptions are merely example specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for determining a terminal associated with an object in a photo, wherein the method comprises:
   identifying, by a first terminal, an object in at least one photo through biological feature recognition; and
   determining, by the first terminal, a second terminal associated with the object in the at least one photo based on object-terminal relationship information;
   wherein the object-terminal relationship information is determined based on wireless signal strength information of the second terminal as detected by the first terminal when each of the at least one photo is captured;

wherein the determining of the object-terminal relationship information comprises:

using, by the first terminal, any one of at least two photos as a reference photo, and using, as a weighting coefficient, a ratio of a first object distance at which the object in the at least two photos other than the reference photo is captured to a second object distance at which the object in the reference photo is captured;

performing, by the first terminal, by using the weighting coefficient, a weighting operation on the signal strength information, to obtain a weighted value of the signal strength information; and if the weighted value of the signal strength information meets a threshold condition, determining the object-terminal relationship information.

2. The method according to claim 1, wherein the object-terminal relationship information is determined based on the at least one photo, and the object distance between the first terminal and the object in the at least one photo.

3. The method according to claim 1, wherein the method further comprises:

sending the photo to the second terminal.

4. An apparatus, wherein the apparatus comprises:

a processor configured to identifying an object in at least one photo through biological feature recognition, wherein the processor is further configured to determine a terminal as being associated with the object in the at least one photo based on object-terminal relationship information stored in a storage unit;

wherein the object-terminal relationship is determined based on wireless signal strength information of the second terminal as detected by the first terminal when each of the at least one photo is captured;

wherein the processor uses any one of at least two photos as a reference photo, and uses, as a weighting coefficient, a ratio of a first object distance at which the object in the at least two photos other than the reference photo is captured to a second object distance at which the object in the reference photo is captured; and wherein the processor performs, by using the weighting coefficient, weighting calculation on the signal strength information, to obtain a weighted value of the signal strength information; and if the weighted value of the signal strength information meets a threshold condition, determines the object-terminal relationship information.

5. The apparatus according to claim 4, wherein
the object-terminal relationship information is determined based on the at least one photo and the object distance between the apparatus and the object in the at least one photo.

6. The apparatus according to claim 4, wherein the terminal further comprises a transmitter, wherein
the transmitter is configured to send the photo to the terminal of the object.

7. A non-transitory computer readable storage medium, wherein the computer readable storage medium stores a computer program, and when the computer program is executed by a processor, the following method is implemented:

identifying an object in at least one photo through biological feature recognition;

determining a terminal as being associated with the object in the photo based on object-terminal relationship information; and wherein the object-terminal relationship information is determined based on wireless signal strength information of the second terminal as detected by the first terminal when each of the at least one photo is captured;

wherein the determining of the object-terminal relationship information comprises:

using any one of the at least two photos as a reference photo, and using, as a weighting coefficient, a ratio of an object distance at which the object in the at least two photos other than the reference photo is captured to an object distance at which the object in the reference photo is captured;

performing, by using the weighting coefficient, a weighting operation on the signal strength information, to obtain a weighted value of the signal strength information; and if the weighted value of the signal strength information meets a threshold condition, determining the object-terminal relationship information.

8. The storage medium according to claim 7, wherein the method further comprises:

determining the object-terminal relationship information based on at least two photos, and the object distance at which the object in each of the at least one photo is captured.

9. The method according to claim 1, wherein the method further comprises:

sending the photo to the second terminal.

10. The apparatus according to claim 4, wherein the apparatus further comprises a transmitter, wherein
the transmitter is configured to send the photo to the terminal of the object.

* * * * *

UNITED STATES PATENT AND TRADEMARK OFFICE
CERTIFICATE OF CORRECTION

PATENT NO. : 11,790,647 B2
APPLICATION NO. : 16/495873
DATED : October 17, 2023
INVENTOR(S) : Xuenan Zhang It is certified that error appears in the above-identified patent and that said Letters Patent is hereby corrected as shown below:

On the Title Page

On the page 2, in Column 1, under "Abstract", Line 1, delete "a an" and insert -- an --.

Signed and Sealed this
Sixteenth Day of January, 2024

Katherine Kelly Vidal
*Director of the United States Patent and Trademark Office*